United States Patent

[11] 3,630,627

[72] Inventors George M. Low
 Acting Administrator of the National
 Aeronautics and Space Administration with
 respect to an invention of;
 Charles W. Cable, Bellevue, Wash.
[21] Appl. No. 15,025
[22] Filed Feb. 27, 1970
[45] Patented Dec. 28, 1971

[54] SOLAR CELL ASSEMBLY TEST METHOD
 8 Claims, 6 Drawing Figs.
[52] U.S. Cl. .................................................. 356/222,
 210/212
[51] Int. Cl. ...................................................... G01j 1/42,
 H01j 39/12

[50] Field of Search............................................ 356/222,
 225; 250/212

[56] References Cited
 UNITED STATES PATENTS
 3,435,246 3/1969 Webb.......................... 356/222

Primary Examiner—Ronald L. Wibert
Assistant Examiner—Conrad Clark
Attorneys—G. T. McCoy, J. H. Warden and Monte F. Mott ABSTRACT: Defects in a solar cell assembly are located by measuring power generation from the assembly as selected cells are subjected to differential illumination either by shadowing the cell or by applying local higher intensity illumination to the cell.

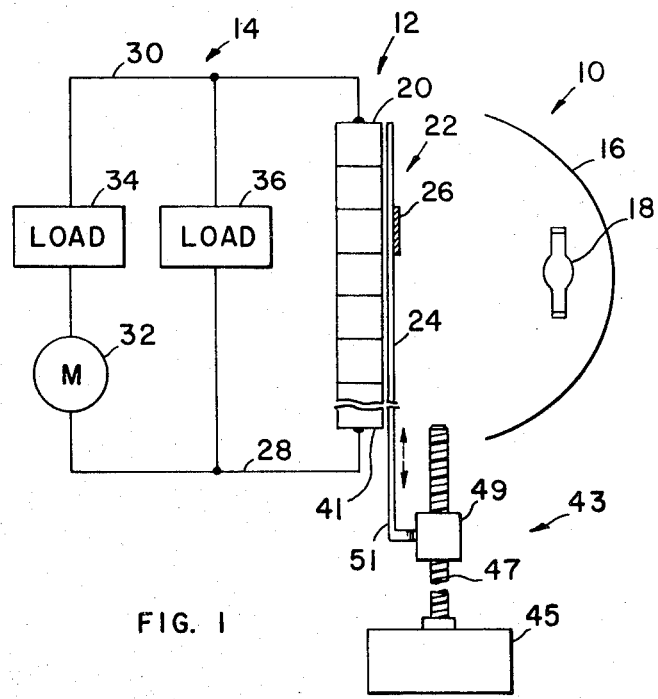
FIG. 1
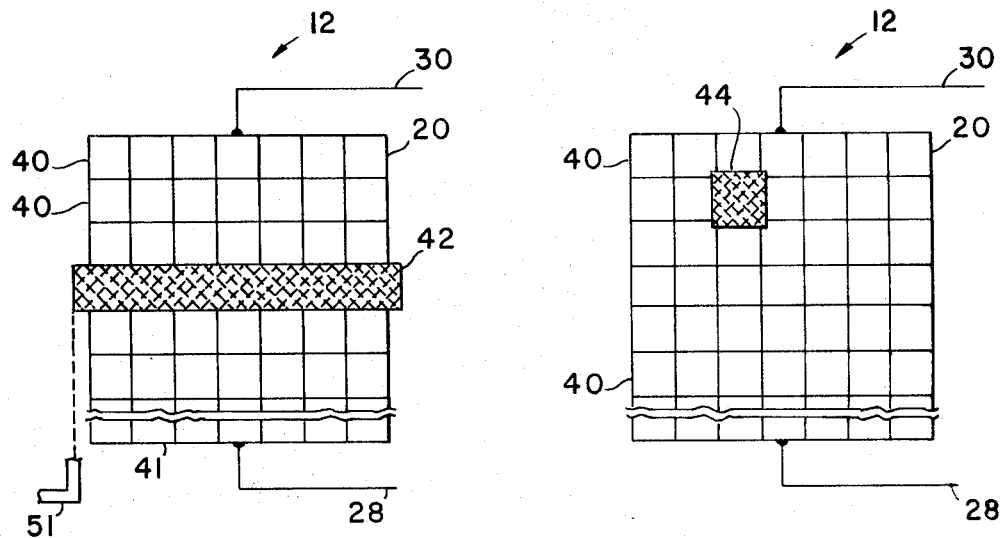
FIG. 2
FIG. 3
INVENTOR
CHARLES W. CABLE
BY J. N. Warden
G. McCoy
ATTORNEYS INVENTOR
CHARLES W. CABLE
BY  J. H. Warden
    G. McCoy
ATTORNEYS

SOLAR CELL ASSEMBLY TEST METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to an apparatus and method for testing an assembly of photovoltaic cells and more particularly this invention relates to a method and apparatus for testing the integrity or presence of faulty cells in solar cell matrices.

2. Description of the Prior Art

There are a variety of energy-sensitive devices that are extensively utilized to convert energy from one form to another. For example, solar cells have been successfully employed to convert incident solar radiation energy into electrical energy. Solar cell blanks are fabricated as slices cut from specially prepared single crystal semiconductor ingots. As would be expected, power capability of a solar cell is proportional to its radiation collection area. However, due to manufacturing limitations in processing single crystal semiconductor ingots, the collection area must be restricted to relatively small unit sizes. Thus, the power output produced by any single cell is quite limited; and, therefore, the cells must be grouped into matrices to provide a power summation at a level suitable for its intended use.

Solar cell energy systems are and will be extensively utilized in outer space investigation to maintain a charge on conventional batteries and to provide direct energization of certain devices. The space program whether manned or unmanned requires the highest reliability of all components.

Solar cell arrays are usually assembled first in groups of cells in parallel. These groups are then connected in series to obtain the required output voltage of a string. The detection of faulty cells or connections in an assembled string or larger submodule or array has been difficult. Measuring the electrical resistance of each group requires repeated probing and is not a positive test for the open circuit failure mode because the combined resistance of the remaining cells in parallel may be approximately the same as that of a satisfactory group. Stimulation of the entire module and measurement of electrical output, obtaining a V-I curve, and then proceeding to group-by-group trouble shooting, requires skillful investigative techniques which are even more necessary in determining which cell within a group is discrepant. If there is no visible evidence of damage, careful thermal techniques or trial and error methods become necessary to locate the faulty cell.

OBJECTS AND SUMMARY OF THE INVENTION

It is therefore an object of this invention to provide a technique and system for testing solar cell assemblies.

A further object of the present invention is to provide a simplified technique for identifying faulty cells or connections between cells in solar cell assemblies, arrays or submodules.

A further object of the invention is to provide an improved, simplified solar cell assembly test method which can be operated by unskilled personnel for the testing of the integrity and reliability of assemblies of solar cell elements.

These and other objects and many attendant advantages of the invention will become apparent as the description proceeds.

A solar cell assembly test system, according to the invention includes a means for illuminating an electrically interconnected group of solar cells, means for applying a differential illumination to selected cells in said group and electrical measuring means connected to said group for determining an electrical output parameter thereof. The differential illumination may be conducted by shadowing or masking at least one selected cell or by applying a local higher intensity illumination to the selected cell(s).

The test procedure is conducted during illuminating individual or groups of cells at a intensity level sufficient to provide a significant electrical output from the cells. An electrical parameter of the output of the group is measured as selected cells are differentially illuminated. Using this technique, a single open circuit cell or a shorted group may be readily identified without detailed probing or troubleshooting. Usually only one electrical hookup is necessary.

The invention will now become better understood by reference to the following detailed description when considered in conjunction with the accompanying drawings.

BRIEF DESCRIPTION OF THE DRAWINGS

FIG. 1 is a schematic view of a differential shadowing solar-assembly test system according to the invention;

FIG. 2 is a top view of a parallel oriented shadow applied to a solar cell assembly;

FIG. 3 is a top view of a shadow pattern covering a single cell of a solar cell assembly;

DESCRIPTION OF THE PREFERRED EMBODIMENTS

Figure 5:
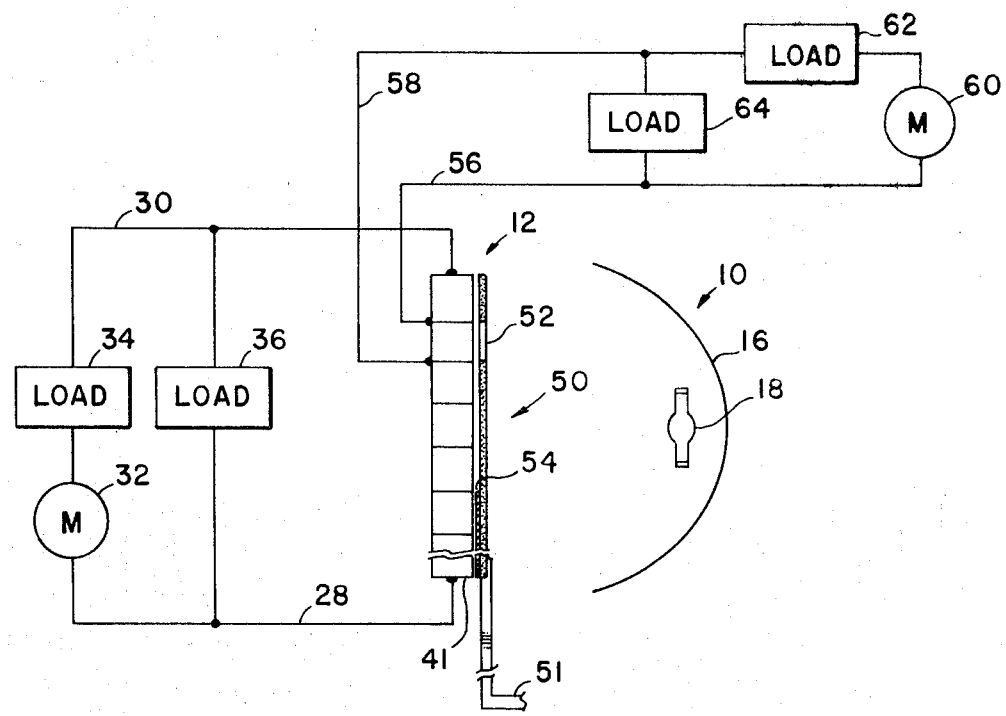
FIG. 5 is a schematic view of a local higher intensity illumination system for testing solar cell assemblies.

Referring now to FIG. 1, the first embodiment of the solar cell test system, according to the invention, includes a differential illumination system 10, a solar cell assembly 12 and an electrical measurement hookup 14. The illumination system 10 includes a reflector 16 in which is supported a lamp 18 such that illumination of even intensity is applied over the face of the solar cell assembly 12. Any suitable light source may be used including natural sunlight, an incandescent filament, arc or gas-filled lamp. The light may be of constant intensity, cyclic or intermittent and controlled by electrical or mechanical means such as a shutter and aperture control device.

The solar cell assembly 12 includes a plurality of electrically interconnected individual solar cells 20. Solar cell assemblies or arrays are usually assembled first in groups 40 of cells connected in parallel. These groups 40 are then connected in series to form strings 41. A final assembly or array contains N groups of cells connected in series. Interposed between the illumination source 10 and the solar cell assembly 12 is a differential illumination member 22 which includes a background member 24 having a first property of transmissivity to which is applied a selected area 26 having an opposite transmissive property.

Figure 4:
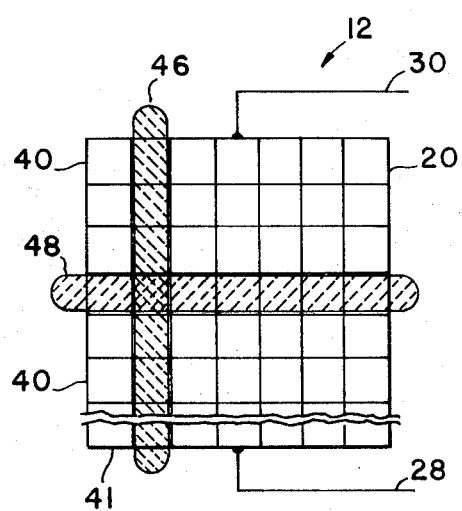
FIG. 4 is a top view of parallel and series oriented light patterns applied to a solar cell assembly.

For example, the background member 24 may be radiation transparent and the portion 26 may be in the form of a bar of radiation-opaque material of a length coincident with the length of a cell to form a shadow pattern 42 as shown in FIG. 2. If the radiation-opaque material is coincident in size with that of a single cell, a shadow pattern 44 such as that shown in FIG. 3 will be formed. In the converse case the background member 24 may be radiation opaque while the portion 26 may be radiation transmitting to form selective light patterns 46, 48 as shown in FIG. 4.

Referring again to FIG. 1, conductors 28 and 30 are electrically connected to the ends of the assembly 12 and to an electrical measuring system which includes a meter 32 and may optionally include a series-connected load member 34 and a parallel-connected load member 36. The meter or read out instrument 32 may measure any desired electrical characteristic with or without the external load members 34, 36. The type of meter instrument used should correspond to the type of illumination. An oscilloscope, for example, might be used when a gas discharge lamp is used for illumination.

The differential illumination member 22 is mounted for free movement across the surface of the solar cell assembly 12, and is preferably connected to a scanning system 43. The scanning system 43 includes a reversible motor 45 driving a screw 47. A nut 49 is mounted on the screw 47. A carriage arm 51 extends between nut 49 and the member 22. When the motor 45 is turned on and the screw 47 rotates, the nut 49 will move vertically and the member 22 will scan the surface of the assembly 12.

The test system is operated with the illumination source turned on and the electrical measuring system 14 operative to detect any change in output. The differential member 22 is then translated with respect to the light active surface of the solar cells 20 to provide systematic scanning of the assembly with light and shadow patterns.

Referring now to FIG. 2, a solar assembly 12 having a shadow pattern 42 covering a group 40 of cells 20 is displayed. Each group 40 is shown with seven cells 20 connected in parallel and the groups 40 are connected in series to form a final parallel series-connected assembly or array 12. Shadowing of parallel-connected groups 40 of cells can be used to locate shorted groups. The groups are sequentially shadowed with a shadow pattern 42. Because the groups are connected in series to form a string 41 and because of the blocking-diode action of the unlighted cells 20 under the shadow pattern 42, only a shorted group will permit current flow and cause a measurable assembly output in meter 32 when the group is shadowed.

Referring now to FIG. 3, an illuminated solar cell assembly 12 is shown with a shadow pattern 44 selectively shadowing a single cell 20. By scanning cells of the assembly individually, the following defects can be identified. When an open cell or shorted group is shadowed, there will be no change in output. When an active cell 20 in a group 40 containing an open cell is shadowed, there will be marked reduction in output in the order of 12 percent loss at maximum power point operation. When an active cell in a normal group is shadowed there will be a slight reduction in assembly power output on the order of 1 percent at the maximum power point operation.

These techniques may also be utilized to identify and locate the presence of defective or low-yield cells. Assembly power output reactions for these cells should vary somewhat from the above reactions depending upon the type of defect. For example, greater than expected assembly power loss when each of six cells in a seven cell group is individually shadowed but less than the expected power loss when the remaining cell is individually shadowed identify the latter cell for further investigation.

Referring now to FIG. 4, a solar cell assembly 12 is displayed having a series oriented light pattern 46 applied to strings 41 of cells and a parallel-oriented light pattern 48 applied to groups 40 of solar cells 20. The testing system is operated in this mode by applying a series-oriented light pattern 46 in which only one cell 20 of each group 40 is illuminated with a parallel-oriented light pattern 48 utilized to locate open or defective cells. The series-oriented light pattern 46 is scanned across the light-sensitive surface of the solar cell assembly 12 until reduced or zero output is indicated on meter 32, as compared to the output of the other strings of cells in series when illuminated with the light pattern 46. While holding the series-oriented light pattern 46 over the reduced or zero output string 41, scanning is then initiated with the parallel-oriented light pattern 48 in which one or more cells in parallel are illuminated. The defective or open cell 20 is located when illumination with the parallel-oriented pattern 48 restores electrical output. The electrical output when only one cell out of each group is illuminated will be much less than that obtained with full illumination, but will still be measurable. If there is more than one defective cell in this series-oriented pattern, additional or larger area parallel-oriented patterns will be required.

A testing system utilizing local higher intensity illumination is illustrated in FIG. 5. The system is similar to that described with FIG. 1 and includes an illumination source 10, a solar cell assembly 12 and electrical output measuring system 14. The differential illumination member in this case is a sheet 50 containing a radiation-transmitting aperture 52 and background portion 54 which is partially transmissive to provide sufficient background illumination to just exceed the photovoltaic threshold of the cells 20. The measuring system may also provide group output measurement by means of conductors 56 and 58 connected to a single group 40 and to a second meter 60. Optional load members 62 and 64 may again be provided.

Figure 6:
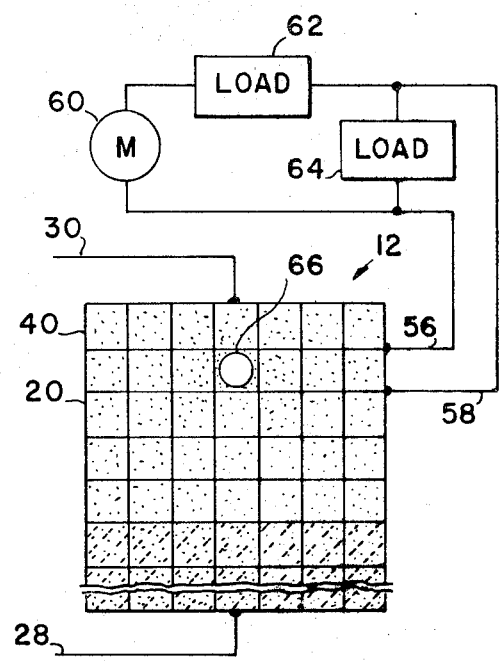
FIG. 6 is a top view of the system of FIG. 5.

Referring now to FIG. 6, the aperture 52 provides local higher intensity illumination on a cell 66 within the group 40. By scanning the individual cells 20 of a group 40 with the single cell light pattern while applying background illumination to the remaining cells in the group, a change in group output will indicate location of a defective cell.

The method and apparatus of the present invention provide a simplified and accurate technique for testing the integrity of interconnection and output performance of the individual and interconnected cells of solar cell assemblies. The inventive technique may be used alone or in conjunction with usual solar simulation, vibration thermal and other tests to locate intermittent faults without disturbing the cells of interconnectors.

It is to be realized that only preferred embodiments of the invention have been disclosed and that numerous substitutions, alternations and modifications are all permissible without departing from the spirit and scope of the invention as defined in the following claims.

What is claimed is:

1. A solar cell assembly test apparatus comprising in combination:
an electrically interconnected assembly of solar cells comprising a planar array of a plurality of groups of parallel-connected solar cells having series interconnections between said groups;
illumination source means for applying radiation to the active surface of each cell of the array;
differential illumination means disposed between the source means and the surface of the array comprising a sheet of material having a first transmissivity to said radiation and containing a selected pattern of opposite transmissivity for applying a selected pattern of radiation to the active surface of less than all of the cells of said array;
scanning means connected to said sheet of material for translating said sheet over the surface of said array and for successively scanning said selected pattern over different, selected cells of said array to successively illuminate a plurality of selected, cell patterns; and
electrical measuring means connected to said assembly for measuring the electrical power output of said successively illuminated patterns of cells.

2. An apparatus according to claim 1 wherein said pattern is coincident with the boundaries of a single cell.

3. An apparatus according to claim 1 wherein said pattern is coincident with the boundaries of a plurality of adjacent, interconnected cells.

4. An apparatus according to claim 1 in which said differential illumination means comprises a radiation-transmissive sheet containing a pattern of radiation-opaque material.

5. An apparatus according to claim 1 wherein said differential illumination means comprises a radiation-opaque sheet containing a radiation-transmissive pattern.

6. An apparatus according to claim 1 wherein said differential illumination means comprises a sheet of partially radiation-transmissive material containing a radiation-transparent pattern.

7. A method of testing a solar cell assembly comprising a planar array of solar cells parallel interconnected into a plurality of adjacent groups and with series interconnections between the groups comprising the steps of:
applying illumination radiation to the active surface of all of the cells of the array;

disposing a differential illumination member between said illumination radiation and said surface comprising a sheet including a background portion having first transmissivity to said radiation and including a pattern covering a portion of adjacent cells of the array having opposite transmissivity to said radiation to apply a selective illumination pattern to the active surface of less than all the solar cells of said assembly to provide a first photovoltaic output;

translating said sheet and said pattern successively across said surface to selectively illuminate patterns of other cells in said array and to provide successive photovoltaic outputs; and measuring said photovoltaic electrical outputs from the successively illuminated patterns of cells to determine an anomalous output response from any of said illuminated patterns.

8. A method according to claim 7 further including the step of recording the photovoltaic output from each of said illuminated patterns, comparing said recorded outputs and rejecting said array according to the presence of an anomalous response in said recorded outputs.

* * * * *